(12) United States Patent
Russell

(10) Patent No.: US 6,378,841 B1
(45) Date of Patent: Apr. 30, 2002

(54) QUARTER-TURN ROTARY PLUG VALVE WITH SEATS RECIPROCABLE DURING OPERATION

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 0 days.

(21) Appl. No.: 09/696,490

(22) Filed: Oct. 25, 2000

Related U.S. Application Data

(60) Provisional application No. 60/162,387, filed on Oct. 29, 1999.

(51) Int. Cl.[7] ............................................. F16K 25/00
(52) U.S. Cl. ...................... 251/160; 251/158; 251/162; 251/170; 251/192; 251/304; 251/314; 251/315.01
(58) Field of Search ................................ 251/158, 159, 251/160, 162, 163, 170, 192, 157, 304, 315.01, 314; 475/14

(56) References Cited

U.S. PATENT DOCUMENTS

| | | | |
|---|---|---|---|
| 622,875 A | * | 4/1899 | Woerner et al. |
| 1,722,752 A | * | 7/1929 | Karnath |
| 3,081,648 A | | 3/1963 | Duer |
| 3,746,302 A | | 7/1973 | Larsen |
| 3,993,136 A | | 11/1976 | Mott |
| 4,257,752 A | * | 3/1981 | Fogarty ....................... 418/34 |
| 4,340,088 A | | 7/1982 | Geisow |
| 4,436,280 A | | 3/1984 | Geisow |
| 4,508,173 A | * | 4/1985 | Read ........................... 166/330 |
| 4,548,384 A | | 10/1985 | Harding |
| 4,603,742 A | * | 8/1986 | Wong et al. ................. 166/374 |
| 4,989,641 A | | 2/1991 | Jones et al. |
| 5,005,805 A | | 4/1991 | Morris et al. |
| 5,179,973 A | | 1/1993 | Dickson et al. |
| 5,322,261 A | | 6/1994 | Aarnes |
| 5,551,666 A | | 9/1996 | Irnich |
| 5,611,516 A | | 3/1997 | Reinicke et al. |
| 5,755,427 A | | 5/1998 | Koskinas |
| 5,842,680 A | * | 12/1998 | Bustanmante et al. ........ 251/65 |
| 6,092,506 A | | 7/2000 | Takagi et al. |

FOREIGN PATENT DOCUMENTS

EP 0 647 301 B1 4/1995

* cited by examiner

*Primary Examiner*—Philippe Derakshani
(74) *Attorney, Agent, or Firm*—Elizabeth R. Hall

(57) ABSTRACT

A method and apparatus for controlling fluid flow with a quarter-turn plug valve with seats operated to lift off the sealing surface of the plug prior to plug rotation and to reseat upon completion of plug rotation. One embodiment shown relates to a quarter-turn rotary plug valve having a handle operable through a 90 ° angle and having both upstream and downstream seats which are operated to lift off from the sealing surface of the plug prior to initiation of plug rotation and then reseat upon completion of plug rotation.

19 Claims, 7 Drawing Sheets

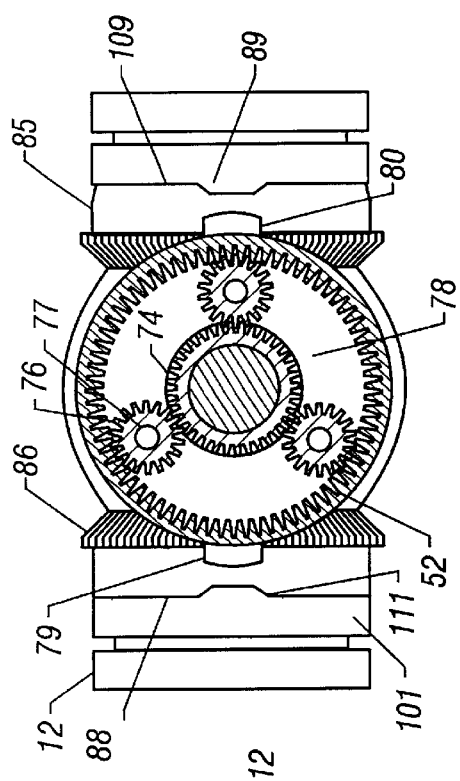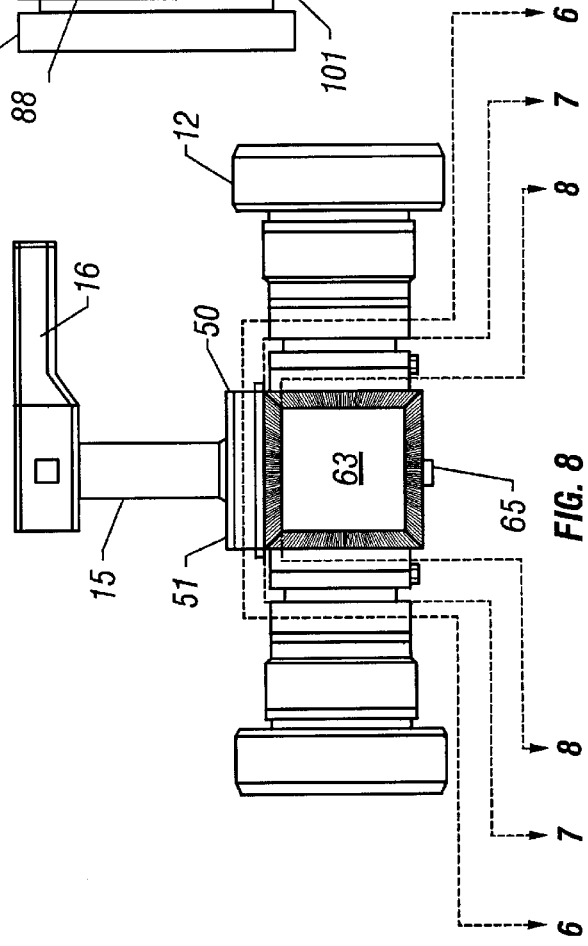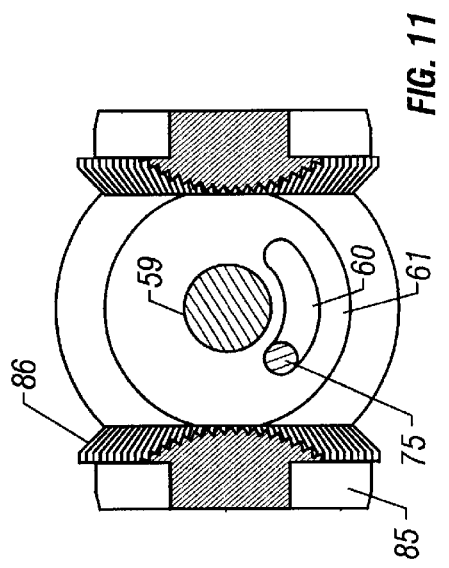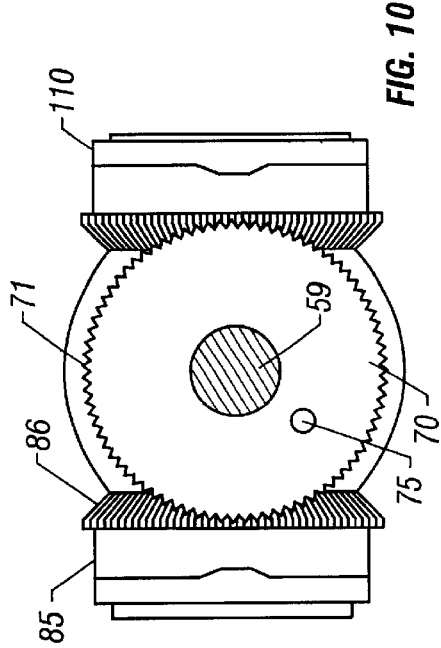

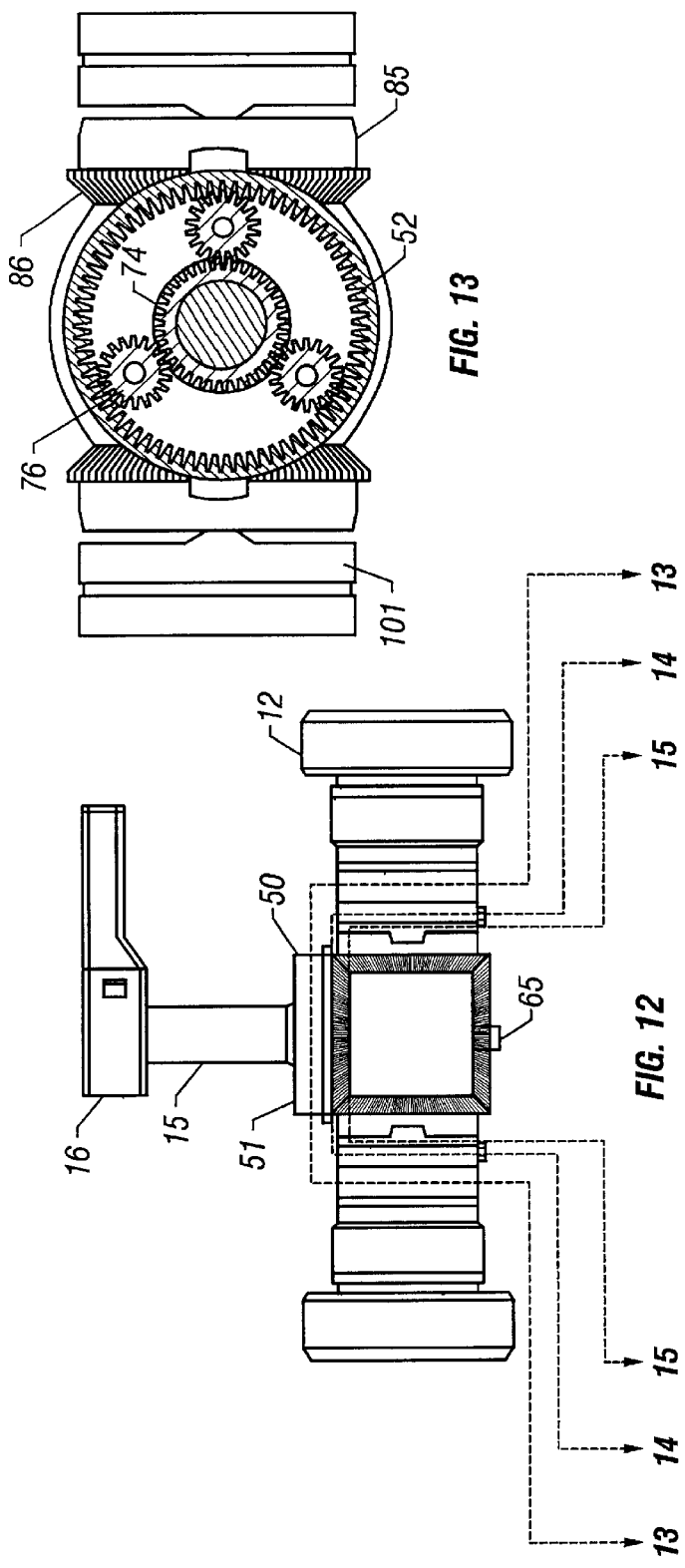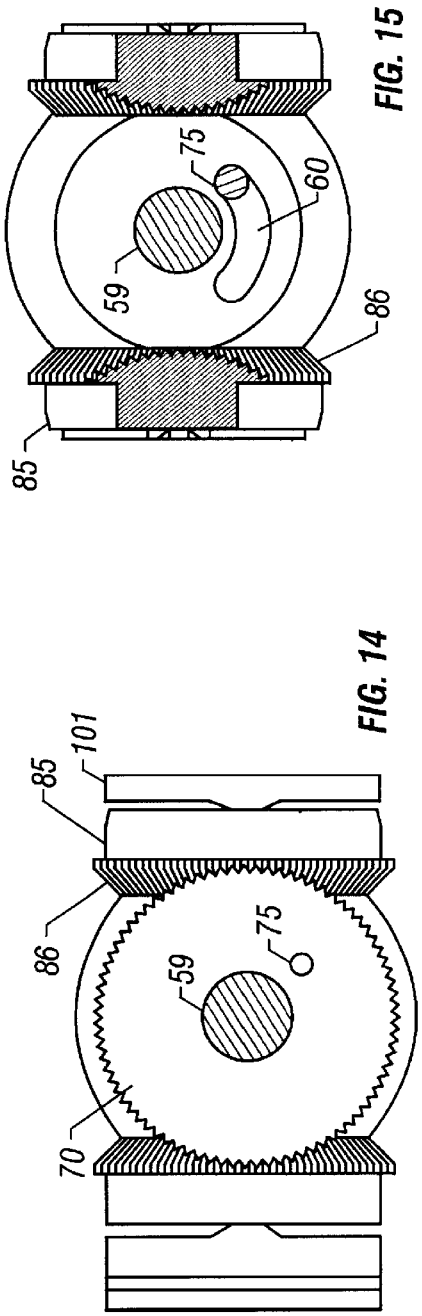

QUARTER-TURN ROTARY PLUG VALVE WITH SEATS RECIPROCABLE DURING OPERATION

CROSS-REFERENCE TO RELATED APPLICATION

The present application claims the benefit of 35 U.S.C. 111(b) Provisional application Ser. No. 60/162,387 filed Oct. 29, 1999, and entitled Quarter-Turn Rotary Plug Valve with Seats Reciprocable During Operation.

BRIEF DESCRIPTION OF THE INVENTION

The present invention relates in general to a method and apparatus for controlling fluid flow with a quarter-turn plug valve with seats operated to lift off the sealing surface of the plug prior to plug rotation and to reseat upon completion of plug rotation. More particularly, the invention relates to a quarter-turn rotary ball valve having a handle operable through a 90° angle and having both upstream and downstream seats which are operated to lift off from the sealing surface of the ball prior to initiation of ball rotation and then reseat upon completion of ball rotation.

BACKGROUND OF THE INVENTION

Certain types of on/off valves have severely attenuated lives due to very concentrated flows with non-axial components during the initial stages of valve opening and final stages of valve closing. In particular, the seats of ball valves and rotary plug valves are susceptible to damage from this type of flow. A second problem which impacts valve actuation is high actuation forces and seat wear due to friction from relative motion of the seats and the sealing plug. This type of problem is common to ball valves, rotary plug valves, and gate valves.

Numerous attempts have been made to overcome these problems for on/off valves. For example, valves have been designed to overcome such problems by reciprocably separating the valve seat(s) from the sealing plug (e.g., a ball, plug, or gate) prior to actually moving the sealing plug and reseating the valve seat(s) onto the sealing plug when the sealing plug reaches its new position. Unseating the valve seat during movement permits a considerable reduction in valve operating force and provides a temporary flow path during operation which is less susceptible to abrasive and cavitational wear than valves with standard, non-reciprocating seats.

U.S. Pat. No. 3,993,136 to Mott discloses a ball valve with lift-off seats configured for operation as a downhole safety valve. This valve operates by means of a linearly reciprocating hydraulic piston concentric with the flow axis of the valve and operating a mechanism which raises the seats from the ball surface prior to rotation and then reseats the valve seats upon completion of rotation. However, this ball valve is unsuitable for operation either manually or by a conventional 90° actuator.

U.S. Pat. No. 4,548,384 to Harding discloses a ball valve which has a stationary downstream seat and an eccentrically-mounted ball as a sealing plug. Valve stem rotation causes the valve plug to lift off of the stationary seat due to the eccentricity between the stem and the ball. The opened ball is then reseated by camming into engagement with the upstream seat. The ball only touches one seat at a time, so that trash buildup within the valve is a major problem. In addition, the valve has limited use as it can only seal in one direction.

U.S. Pat. No. 5,179,973 to Dickson et al. discloses another downhole valve operable by a piston reciprocating concentrically with the valve flow axis. This valve causes the ball to lift from its seat due to the applied operating force from the piston during operation when opening, while causing the valve to be pulled against its seat during shifting to its closed position. However, like the Harding valve, it will only hold pressure from one direction.

U.S. Pat. No. 5,005,805 to Morris et al. discloses a tapered plug valve which separates the valve plug from its seats by reciprocably lifting the plug about its rotational axis which is transverse to the valve flow axis. The valve plug is rotated after the plug is lifted, and then the valve plug is reseated after completion of rotation. A stem rotation of more than 90° and a special actuator are required to operate this valve. Furthermore, while the transverse reciprocation of the tapered plug causes it to disengage/engage with the seats, the spherical configuration of ball valve sealing surfaces are not compatible with this type of actuation.

U.S. Pat. No. 4,989,641 to Jones et al. discloses a rotary selector valve which uses a Geneva-wheel to move a reciprocable seal out of and into engagement with a sealing port. This device requires a complete turn of its rotational shaft to effect a shifting from one port to another and is not suitable for operation with a conventional 90° actuator.

U.S. Pat. No. 4,340,088 to Giesow discloses a downhole safety valve with a partial ball valve sealing plug which is operated by a flow axis axially reciprocable piston. The sealing plug both rotates and reciprocates away from its seat during actuation to the open position. The actuation motion is produced by a lost-motion rack-and-pinion device. This valve is only single seated, so that it only holds pressure from one side.

European Patent EP 0 647 301 B1 to Coufts et al. discloses a ball valve operable by a piston coaxial with the flow axis of the valve. This valve causes the sealing plug to lift off the seat and then rotate during opening. The valve is not reseated in its open position, so trash buildup is likely. Closing reverses the operation. The valve is only seated for holding pressure from one side.

Thus, a need exists for a valve that can seal for pressure from either direction that provides a reduced valve operating force, is less susceptible to abrasive and cavitational wear, and is operable with a conventional 90° actuator or manual rotation.

SUMMARY OF THE INVENTION

The invention contemplates a valve that preserves the 90° actuation rotation of conventional on/off ball valves while providing the separation of the valve seats from the ball sealing plug prior to and following rotation of the valve plug for actuation. The valve of this invention seals for pressure from either direction by using both upstream and downstream seats.

The disclosed valve will reciprocably separate the valve seat(s) from the sealing plug (e.g., a ball or plug) prior to actually moving the sealing plug, move the sealing plug to its new position (a 90° rotation for a ball or plug valve), and reseat the valve seat(s) onto the sealing plug. This unseating/reseating of the valve seats is done for both opening and closing operations. The disclosed valve permits a considerable reduction in valve operating force, even under high pressures, and provides a temporary flow path during operation which is less susceptible to abrasive and cavitational wear than standard, non-reciprocating valves.

A preferred embodiment of the invention utilizes a planetary gear train to multiply the rotary actuation shaft motion, while a lost motion coupling between the member driven by the multiplied input shaft motion and the ball permits the driven member to operate a rotary barrel cam to actuate the valve seats prior to ball rotation. Alternatively, any other type of suitable motion-multiplying device, such as shown in U.S. Pat. Nos. 5,312,306 or 5,321,988 and incorporated herein by reference, could be used in place of the planetary gear train.

A preferred embodiment of a quarter-turn has a tubular body having a bore flow passage; a valve element having a through flow passage and two sealing surfaces, the valve element rotatable through a quarter turn about an axis transverse to the through flow passage, wherein the through flow passage is aligned with the bore flow passage to permit flow when the valve element is positioned at a first end of the quarter turn and is misaligned with the bore flow passage to prevent flow when the valve element is at a second end of the quarter turn; an actuating valve stem selectively operable through a quarter-turn input motion for effecting opening or closing of said valve element to permit or prevent flow; motion multiplication means operated by rotation of the actuating valve stem; barrel cam means coaxial with the bore flow passage, the cam means engaging the motion multiplication means whereby motion is transmitted to the cam means through a direct-drive coupling; reciprocable seat means providing a seal with the sealing surfaces when in a first position and separated from the sealing surfaces when in a second position, the seat means forced between the first and second positions by movement of the cam means; and lost motion means interposed between the motion multiplication means and the valve element; whereby rotation of the actuating valve stem initiates movement of the cam means to move the seat means into the second position prior to the valve element rotation and then back into the first position upon completion of the valve rotation.

The disclosed valve has at least the following advantages over existing valves: (a) the preservation of quarter-turn actuation shaft motion, (b) the ability to seal pressure from either direction, (c) the reduction of operating forces, and (d) the reduction of the erosion of the valve ball and seats when the valve is operated under high differential pressures. The preservation of quarter-turn operation is important for compatibility with standard manual valve operating practice and conventional valve actuators. Use of a ball valve in normal industrial service requires that the valve be able to seal for pressures in either direction, as this valve does. The lift-off of the valve seats from the sealing plug greatly reduces the pressure differential across the valve plug, so that the torque necessary to rotate the valve plug is reduced both by eliminating the frictional drag of the valve seats on the plug and by reducing the pressure drop-induced friction of the sealing plug with its rotational journals. These improvements combine to provide a valve suitable for severe operating conditions, including high pressure and abrasive service.

BRIEF DESCRIPTION OF THE DRAWINGS

The novel features which are believed to be characteristic of the invention, both as to its construction and methods of operation, together with the objects and advantages thereof, will be better understood from the following description taken in conjunction with the accompanying drawings, wherein:

FIG. 8 shows a side view of a partial cross-section of the quarter-turn plug valve in the open position;

FIGS. 9–11 show a series of cross-sections of the quarter-turn plug valve illustrated in FIG. 8;

FIG. 12 shows a side view of a partial cross-section of the quarter-turn plug valve in a partially closed position;

FIGS. 13–15 show a series of cross-sections of the quarter-turn plug valve illustrated in FIG. 12;

DETAILED DESCRIPTION OF THE INVENTION

Figure 2:
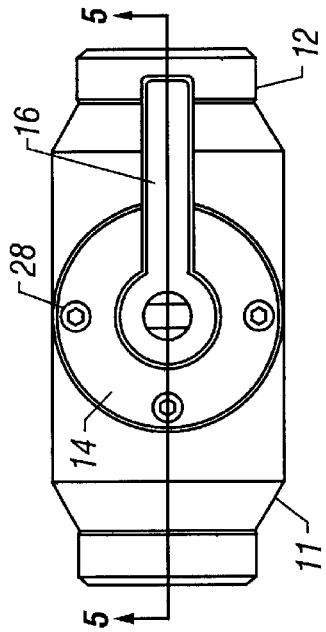
FIG. 2 shows a top view of the quarter-turn plug valve illustrated in FIG. 1.

The present invention provides a valve that reciprocably separates the valve seat(s) from the sealing plug (e.g., a ball or plug) prior to actually moving the sealing plug, moves the sealing plug to its new position (a 90° rotation for a ball valve), and reseats the valve seat(s) onto the sealing plug. This unseating/reseating of the valve seats is done for both opening and closing operations. The valve permits a considerable reduction in valve operating force, even under high pressures, and provides a temporary flow path during operation which is less susceptible to abrasive and cavitational wear than standard, non-reciprocating valves. In addition, the valve can seal for pressure from either direction and is operable with conventional 90° actuation.

Referring now to the drawings, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

Figure 1:
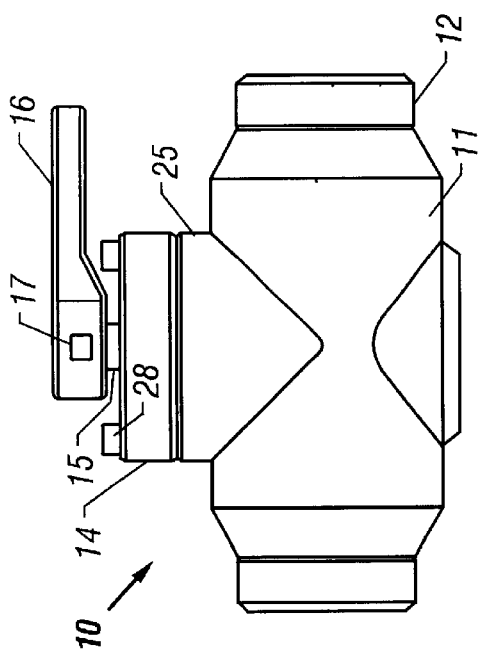
FIG. 1 shows a side view of one embodiment of a quarter-turn plug valve in the open position.

FIGS. 1 and 2 show a ball valve 10 in an open position. Conventional practice has the handle aligned with the flow passage for the open valve and transverse for the closed valve. The internal parts of valve 10 are housed by generally tubular body 11. End pieces 12 are engaged into the opposed ends of body 11 and retain the internal parts of valve 10 in place within the body 11. End pieces 12 are typically threadedly engaged with the body 11 and are threaded to engage with upstream and downstream connections to a piping system. Bonnet 14 is bolted or otherwise engaged with a cylindrical neck 25. Bonnet 14 serves to support the rotatable valve actuation stem 15, which is in turn connected to operating handle 16.

Figure 4:
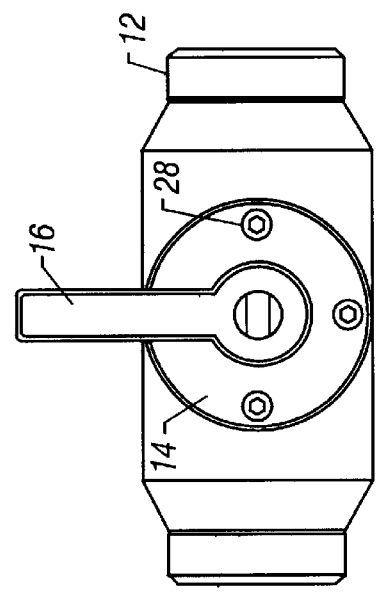
FIG. 4 shows a top view of one embodiment of a quarter-turn plug valve in a closed position.
Figure 3:
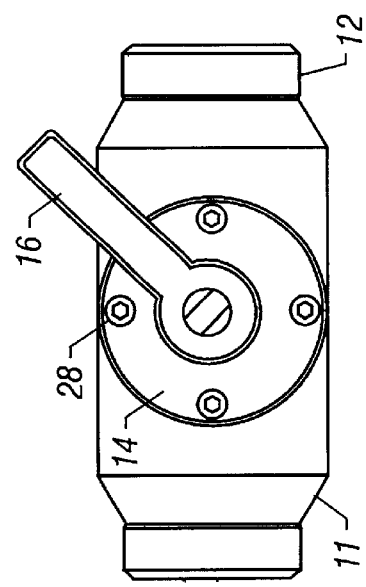
FIG. 3 shows a top view of one embodiment of a quarter-turn plug valve in a partially closed position.

FIG. 3 shows valve 10 in a partially open position and FIG. 4 shows valve 10 in a closed position. The operation of the valve as it moves from an open to a closed position will be discussed in more detail below.

Figure 5:
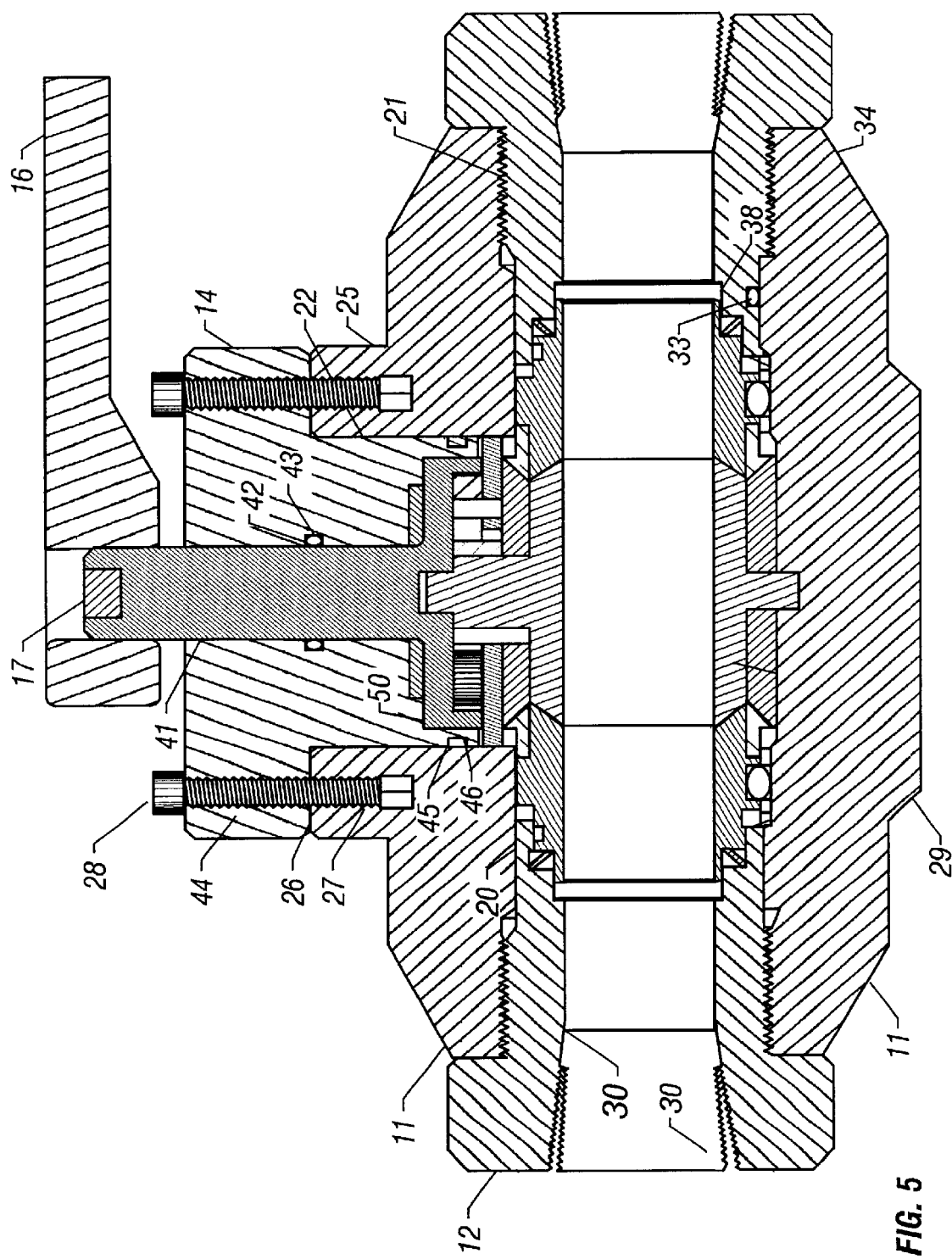
FIG. 5 shows a cross-sectional view of the quarter-turn plug valve illustrated in FIG. 1.

FIG. 5 is a longitudinal section of the valve 10 in FIG. 2. Tubular body 11 has a symmetrical through passage 20 and an internal transverse bore 22. The internal transverse bore 22 has a flat bottom 24 at its extreme end intersection with through passage 20 face. Furthermore, the internal transverse bore 22 intersects through passage 20 at the center of the body 11. The flat bottom 24 is parallel to the longitudinal axis of body 11. Cylindrical neck 25 provides an extended housing for transverse bore 22. At its upper transverse, horizontal end 26, drilled and tapped bolt holes 27 are provided for bolts 28 to engage the holes 27 and retain bonnet 14. Transverse cylindrical body extension 29 reinforces the body 11 in the vicinity of transverse bore 22.

The symmetrical through passage 20 is provided with internal threads 21 at its outer ends for engaging end pieces 12. The end pieces 12 have external threads 34 that threadedly engage the internal threads 21 at the outer ends of body 11. Annular end pieces 12 have through bores 30 with internal pipe threads 31 at their outer ends for attaching the valve into a piping system.

Male O-ring grooves 32 carrying O-rings 33 are positioned to seal between the interior of the body 11 and the exterior surface of end piece 12. The transverse inner ends 36 of end pieces 12 extend sufficiently into the body 11 to permit shouldering and retaining the reciprocating valve seats. The interior ends of end pieces 12 have a first and second stepped counterbore 37 and 38 respectively.

First counterbore 37 provides a cylindrical internal sealing surface for engaging the outer seals of the valve seats 101. First counterbores 37 further provide cavities with transverse back faces for the mounting of seat biasing springs 39. Seat biasing springs 39 can be Belleville springs as shown, split or radially fingered Belleville springs, coil springs, or wave springs. Multiple springs in series may also be used in order to provide sufficient travel without overstress. Second counterbores 38 provide clearance for spring-shrouding seat extensions which shield springs 39 from flow through the valve.

Handle 16 attaches to valve actuation stem 15 by means of comating coaxial keyways and key 17. Actuation stem 15 is journaled in the central through bore 41 of bonnet 14. Female O-ring groove 42, located in the through bore 41 of bonnet 14, contains O-ring 43 which seals between the bonnet 14 and the cylindrical surface of actuation stem 15.

Bolt holes 44 through the transverse top flange of bonnet 14 permit insertion of bolts 28 for clamping the bonnet to end 26 of the cylindrical neck 25 of body 11. The lower outer surface of bonnet 14 extends into transverse bore 22 of valve body 11 and has circumferential male O-ring groove 45 located a short distance above the bottom end of the bonnet. O-ring 46 is located in groove 45 and seals between transverse bore 22 and the lower cylindrical surface of bonnet 14.

Figure 7:
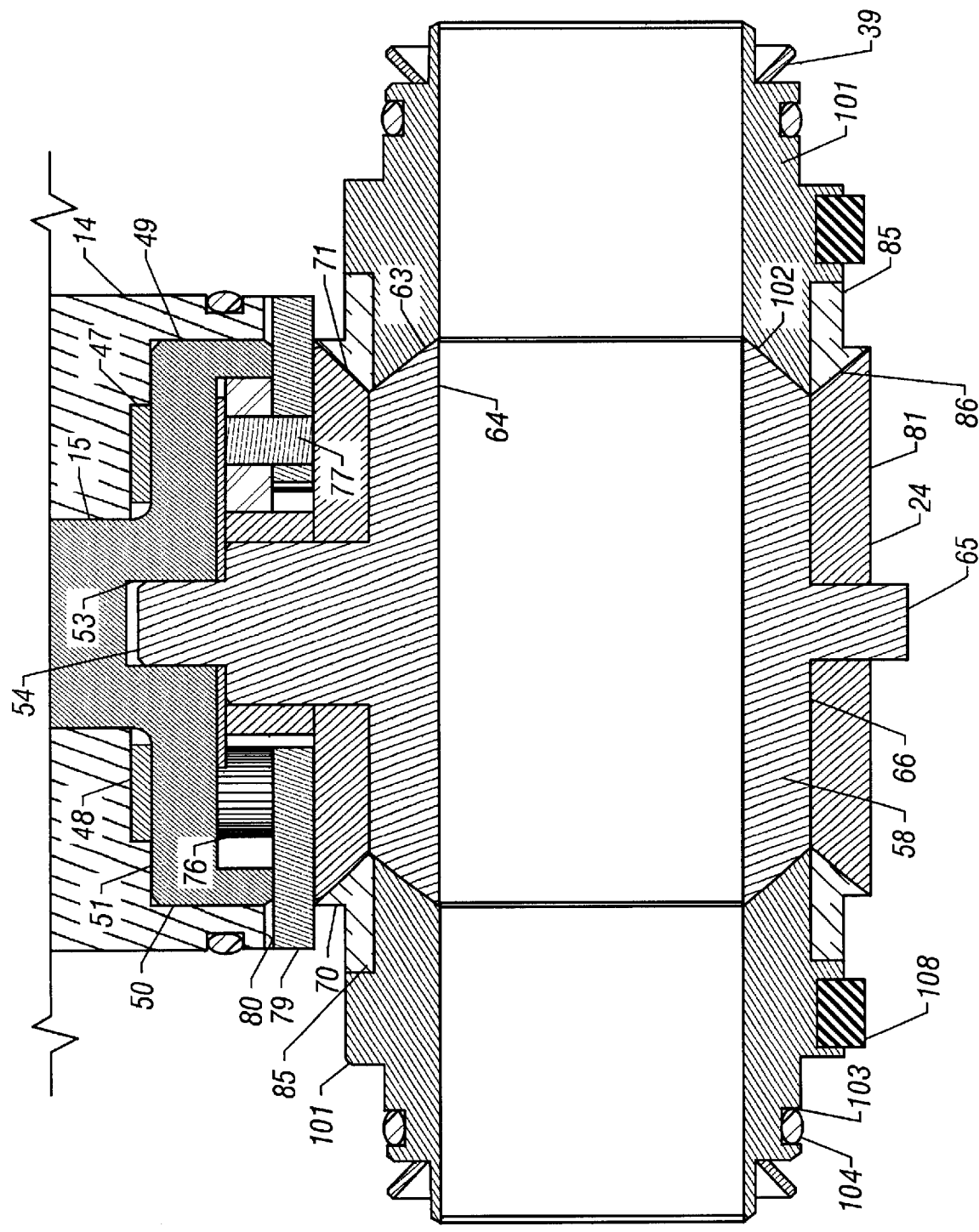
FIG. 7 is blown-up view of the ball valving element shown in FIG. 5.

As seen in FIG. 7, the bottom end of bonnet 14 is step counterbored coaxially with and is adjacent the through bore at its lower end. The smaller counterbore 47 is used to mount thrust bearing 48, while the larger counterbore 49 provides clearance for upset head 50 of the actuation stem 15. The upper surface 51 of the upset head 50 of actuation stem 15 provides a reaction surface which bears on thrust bearing 48.

Figure 6:
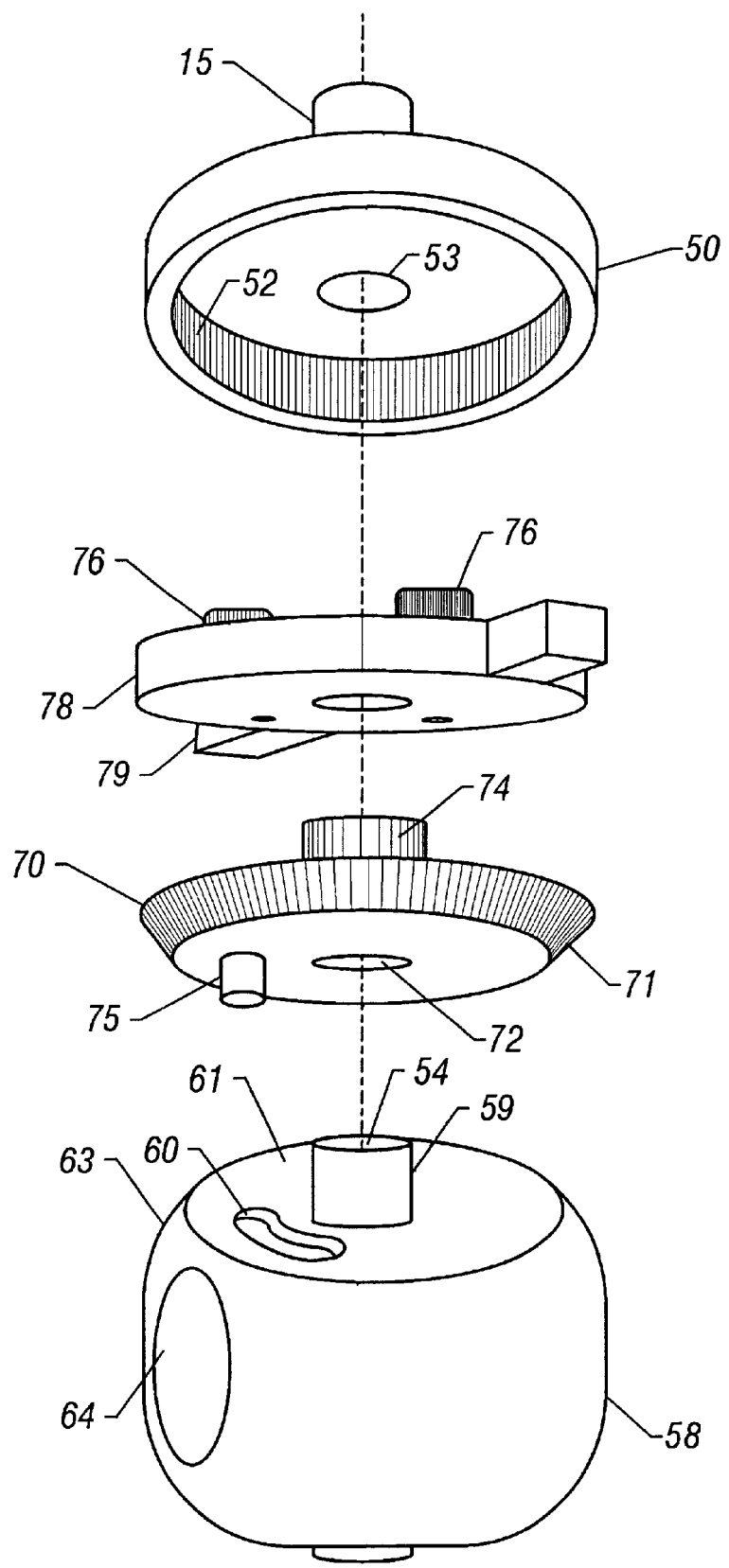
FIG. 6 shows an exploded side view of the rotating internal components of one embodiment of a quarter-turn plug valve.

Turning now to FIGS. 6 and 7, the actuation stem 15 is shown wherein the lower side of the upset head 50 of actuation stem 15 is recessed to form an internal ring gear 52. A counterbore 53, coaxial with the actuation stem 15, is in the center of the lower side of the upset head 50 and provides a journal which supports the upper trunnion end 54 of the ball valving element 58. Coaxial with and immediately below the upper trunnion end 54 of ball valving element 58 is enlarged shaft section 59 which rotationally supports a lost-motion actuator 70. The lost motion actuator 70 is supported from below by transverse upper flat 61 of ball valving element 58. Constant radius slot 60 is positioned in the upper flat 61 of ball valving element 58 and has a 90° arc length. The ends of the radius slot 60 are semicylindrical. Spherical surface 63 of ball valving element 58 serves as the sealing surface of the ball valving element.

As seen in FIG. 7, the through bore 64 of ball valving element 58 is transverse to the axis of rotation of the ball valving element provided by upper trunnion end 54 and lower trunnion end 65. Transverse lower flat 66 is symmetric to upper flat 61 about the axis of through bore 64. Lower trunnion end 65 is journaled for rotation in a short cylindrical bore coaxial with bore 22 and located in the flat bottom 24. Lower trunnion end 65 serves as a shaft for idler bevel gear 81, which bears on lower flat 66.

FIGS. 6 and 7 show the lost motion actuator 70 having a downwardly facing bevel gear 71 rotatable about a central hole 72 which is supported by enlarged shaft section 59 of ball valving element 58. An annular spur sun gear 74 is fixedly mounted coaxial with central hole 72 onto the upper face of lost motion actuator 70 by brazing or other suitable means. Alternatively, a downward-facing boss could be fabricated on sun gear 74 and could be press-fitted into a suitably sized central hole in lost motion actuator 70 so that rotational support for the assembly is provided through the sun gear 74. Downwardly projecting cylindrical stub shaft 75 is mounted to the lower face of lost motion actuator 70 and eccentric to the axis of sun gear 74 for the purpose of imparting motion to ball valving element 58 by engaging the semicylindrical ends of constant radius slot 60.

Turning now to FIGS. 6 and 9, planet spur gears 76 are interposed in a plane and engage both internal ring gear 52 and spur sun gear 74 to complete the planetary gear set. Planet gears 76 are mounted on stationary vertical shafts 77. Shafts 77 have axes transverse to and are mounted to annular plate 78 by press fit or spot welding or other suitable means. Annular plate 78 has a central hole to clear sun gear 74 and is mounted horizontally in a gap between the bottom of upset head 50 of actuation shaft 15 and the upper surface of lost motion actuator 70. Annular plate 78 has radially projecting diametrically-opposed ears 79 which engage comating rectangular slots 80 cut through the downwardly projecting annular wall formed between the lower outer cylindrical section of bonnet 14 and its larger counterbore 49. The ears 79 prevent the annular plate 78 from rotating whenever ring gear 52 is rotated. The pitch diameters of ring gear 52, planet gears 76 and sun gear 74 are chosen such that one turn of ring gear 52 provides two output turns of sun gear 74. In other words, the planetary gear system is a two-to-one motion multiplier. Alternatively, any other type of suitable motion-multiplying device, such as shown in U.S. Pat. Nos. 5,312,306 or 5,321,988 and incorporated herein by reference, can be used in place of the planetary gear train.

Turning now to FIGS. 5 and 7, the spherical sealing surface 63 of the ball valving element 58 provides a sealed surface on each side of the ball valving element 58 where identical annular valve seats 101 are biased toward sealing surfaces 63 by the seat biasing springs 39 when the valve 10 is in an open or a closed position. As the valve is initially turned the valve seats 101 are lifted off the sealing surface 63 by the camming rings 85. The camming rings 85, as shown in FIGS. 7 and 9, are identical annular rings with bevel gears 86 facing inwardly toward ball valving element 58 with the teeth of bevel gears 86 meshed with the teeth of downwardly facing bevel gear 71 of lost motion actuator 70 and idler bevel gear 81. Camming rings 85 are coaxial with the through flow passages 20 of the valve 10.

Figure 17:
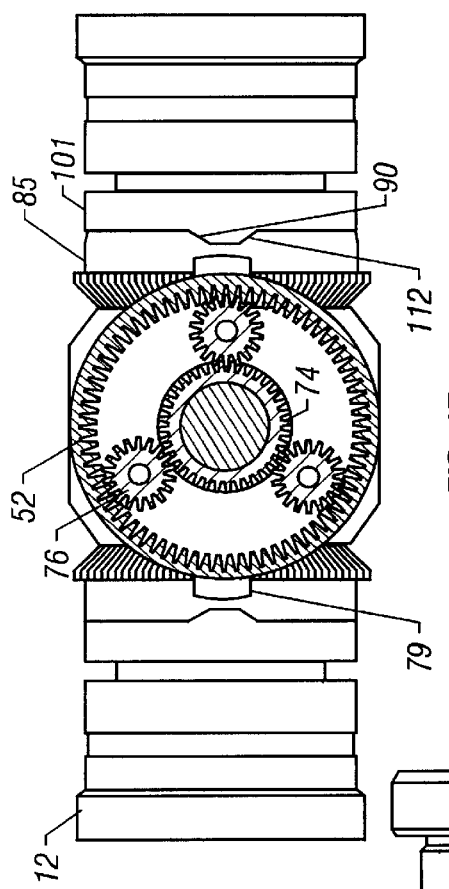
FIGS. 17–19 show a series of cross-sections of the quarter-turn plug valve illustrated in FIG. 16.
Figure 16:
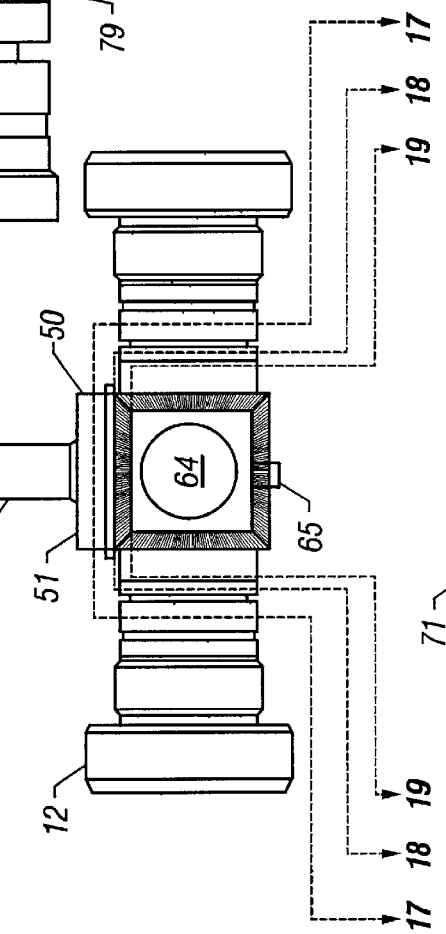
FIG. 16 shows a side view of a partial cross-section of the quarter-turn plug valve in a closed position.
Figure 19:
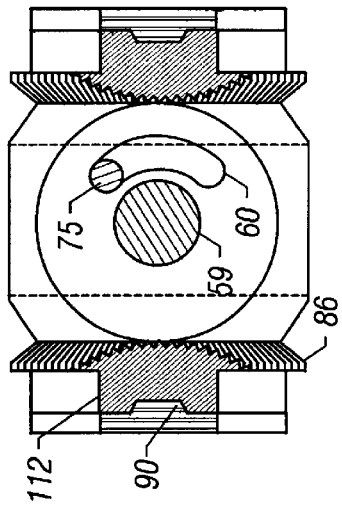
Figure 18:
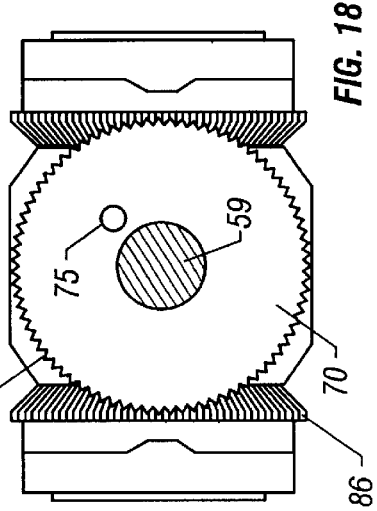

Camming rings 85, shown in FIG. 9, are journaled on their inside cylindrical surfaces by the comating exterior cylindrical surfaces of the valve seats 101. The faces 88 of camming rings 85 are on the opposite ends from bevel gears 86 and are transverse to the axes of the rings, but are provided with detents 180° apart and formed by the tapered side cut-outs 89. Diametrically opposite tapered side cut-outs 89 on camming rings 85 are mirror-image tapered side cut-outs 90 shown on the top in FIG. 17. Face 88 together with cut-outs 89 and 90 form a barrel camming surface on the outer end of camming ring 85. The tapered sides of cut-outs 89 and 90 serve as inclined planes for reciprocating abutting surfaces in the axial direction of the camming rings. The degree of taper for these cut-outs may be adjusted in order to reduce the rotational effort necessary to lift the seats from the spherical surface 63 of ball valving element 58.

As shown in FIGS. 5 and 7, identical valve seats 101 are of annular configuration and are mounted coaxially in through bores 20 of body 11. As shown in this embodiment of the valve, spherical ends 102 are configured to closely mate to spherical surface 63 of ball valving element 58 for metal-to-metal sealing. Use of other types of seating, such as elastomeric seal rings and the like, may also be used. The largest outer diameters of seats 101 are journaled in bores 20 to permit smooth reciprocation therein. It should be noted here that if the journaled lengths of seats 101 were long enough, idler gear 81, which meshes with the lower side of bevel gears 86 would not be required for maintaining coaxial stability for camming rings 85. The reduced outer diameters of seats 101 serve to journal the camming rings 85. On the outer ends opposite the spherical ends 102 of seats 101 are reduced outer diameter sections.

The larger pair of these reduced outer diameter sections is provided with male O-ring grooves 103 containing O-rings 104 which seal between seats 101 and stepped bores 37. The seats are constrained to seal against the ball valving element 58 when they have pressure acting on their side of the ball valving element, due to the differential area between the larger of the reduced outer diameters and the sealing diameter of seat spherical surfaces 102. The transverse shoulders between these reduced outer diameters serve as reaction surfaces for seat biasing springs 39, while the small outer diameter sections protect seat biasing springs 39 from flow.

The inward transverse faces 109, shown in FIGS. 9 and 10, on the ball side of seats 101 are provided with tapered-side bosses 111. These bosses are configured to comate with tapered-side cutouts 89 and 90 of camming rings 85. Diametrically opposite tapered-side bosses 111 are identical mirror-image bosses 112, seen in FIG. 17. Together with transverse faces 109, tapered-side bosses 111 and 112 form barrel cams to comate and coact with the mating barrel cams of the camming rings 85. Keys 108 provided on the bottom sides of seats 101 engage with keyways cut parallel to the valve through axis in the bottom of body 11 so that the seats can freely reciprocate, but cannot rotate. Accordingly, rotation of canning rings 85 causes reciprocation of seats 101 through the interaction of the comating barrel cams of both parts.

Operation of the Preferred Embodiment

The operation of valve closure from an open position is described by a sequential transition from the open state of FIG. 1 to the closed state shown in FIG. 4. When the ball is in the open state, the handle is parallel to the flow passage as seen in FIGS. 1 and 8. FIGS. 9–11 show sequential cross-sections of the valve 10 in the open state. As seen in FIG. 9, identical camming rings 85 are positioned between bevel gears 71 and 86 and the valve seats 101. The faces 88 of the camming rings 85 are provided with detents with tapered side cut-outs 89. The inward face of the valve seats 101 are provided with tapered-side bosses 111. These bosses 111 are configured to comate with tapered-side cutouts 89 when the valve is open.

Initial rotation of handle 16 causes the planetary gear train to rotate, and in the process to double the input motion transferred to the lost motion actuator 70. The partially open valve 10 illustrated in FIG. 3 is shown in more detail in FIGS. 12–15. As the lost motion actuator 70 rotates away from its position corresponding to the open valve state, its degree of rotary motion is equally imparted to the bevel-geared seat camming rings 85. Since valve seats 101 cannot rotate due to keys 108, camming action between faces 88 and detents 89 and 90 of camming rings 85 and faces 109 and bosses 111 and 112 of valve seats 101 initiates virtually as soon as lost motion actuator 70 begins rotation.

In the process of closing, the valve transitions through the intermediate state wherein the seats are cammed off the ball surface and the ball is readied to rotate. This camming occurs as seat tapered side bosses 111 and 112 ramp out of camming ring cam detents 89 and 90 respectively. This camming action forces seat spherical sealing surfaces 102 to separate from spherical sealing surface 63 of ball valving element 58. Following this separation, the pressure differential across the ball is determined by the flow drop across the annular orifices between the seats 101 and the ball valving element 58; this pressure differential will always be less than any non-zero pressure retained by the valve prior to opening. As a result, the frictional force exerted to resist valve rotation by the supporting journals is reduced. Further, the frictional resistance to rotation due to forces exerted on the ball valving element 58 by the pressure-biased seats 101 is reduced to zero. Accordingly, seat separation greatly lowers valve rotational resistance.

While the actuation stem 15 is rotated 45° or less from the open position, lost motion occurs between stub shaft 75 mounted on lost motion actuator 70 and the 90° arcuate, constant-radius groove 60 on upper flat 61 of ball 58. However, further rotation of actuation stem 15 past 45° induces more than 90° of motion to the lost motion actuator, so that stub shaft 75 engages the end of groove 60 and causes the ball valving element to rotate as seen in FIGS. 16–19. At the same time, camming rings 85 are rotating at the same rate as the ball valving element 58, but remain on a flat portion of the cam until the ball valving element rotation to the closed position is nearly complete. For the last portion of the rotation of actuation stem 15, the separation of seat sealing surfaces 102 from the valve spherical sealing surface 63 is reduced to zero by camming when seat tapered side bosses 111 and 112 reenter the camming ring detents 89 and 90 while simultaneously the valve is reaching its closed position. The mating of the tapered side bosses and detents when in the valve closed position is diametrically opposed to that when in the valve open position.

The operation of the valve in opening from the closed position is not the reverse of the closing operation because of the lost motion between the lost motion actuator and the ball. This lost motion ensures that the seats are lifted from the sealing surface of the ball prior to rotation, whichever direction the valve handle is rotated. The valve rotation always occurs during the second 45° half of the 90° actuation stem rotation. Otherwise, the opening of the valve from its closed position is the reverse of the closing operation.

It may be seen from the foregoing description that this valve provides a definite improvement in the operation of ball valves, enabling improvements in pressure capability, service life, and economies in actuators. The valve will perform substantially better in abrasive or cavitating service than conventional valves, due to the avoidance of flow concentration during initial valve opening and final valve closing. A particular advantage is the retention of a 90° actuation motion, since this preserves the same operating pattern for both mechanical and manual operation. Further, it may readily be seen that this same mechanism is directly adaptable to rotary plug valves. It is to be understood that this invention is not limited in its application to the details of construction and the arrangement of components set forth in the description or illustrated in the drawings. The invention is capable of other embodiments and of being practiced and carried out in various ways. Also, it is to be understood that the phraseology and terminology employed herein is for the purposes of description and should not be regarded as limiting.

What is claimed is:

1. A quarter-turn valve comprising:
    a tubular body having a bore flow passage;
    a valve element having a through flow passage and two or more sealing surfaces, said valve element rotatable through a quarter turn about an axis transverse to said through flow passage, wherein said through flow passage is aligned with said bore flow passage to permit flow when said valve element is positioned at a first end of the quarter turn and is misaligned with said bore flow passage to prevent flow when said valve element is at a second end of the quarter turn;
    an actuating valve stem selectively operable through a quarter-turn input motion for effecting opening or closing of said valve element to permit or prevent flow;
    motion multiplication means operated by rotation of said actuating valve stem;
    cam means coaxial with the bore flow passage, said cam means engaged by the motion multiplication means whereby motion is transmitted to the cam means from said motion multiplication means through a direct-drive coupling;
    reciprocable seat means providing a seal with said sealing surfaces when in a first position and separated from said sealing surfaces when in a second position, the seat means forced between the first and second positions by movement of said cam means; and
    lost motion means interposed between said motion multiplication means and said valve element;
    whereby rotation of said actuating valve stem initiates movement of said cam means to move the seat means into the second position prior to the valve element rotation and then back into the first position upon completion of the valve rotation.

2. The quarter-turn valve of claim 1 wherein the valve is a ball valve.

3. The quarter-turn valve of claim 1, wherein the motion multiplication means is a two-to-one motion multiplier.

4. The quarter-turn valve of claim 1, wherein the motion multiplication means is a planetary gear system having a plurality of planet spur gears, each planet gear engaging a sun gear and a ring gear, said ring gear affixed to the actuating valve stem and rotated therewith.

5. The quarter-turn valve of claim 4, wherein each rotation of the ring gears will cause two rotations of the sun gear.

6. The quarter-turn valve of claim 4, wherein the rotation of said sun gear rotates a first bevel gear attached to said lost motion actuator, said bevel gear engaged with a second bevel gear on said cam means whereby said rotation of said sun gear causes the rotation of the cam means thereby reciprocating the seat means between said first and said second positions.

7. The quarter-turn valve of claim 1, wherein the lost motion means comprises an eccentric stub shaft projecting into an eccentric arcuate groove on a top surface of the valve element, wherein the stub shaft travels in an arcuate path within the groove without turning the valve element until the stub shaft abuts an end of the groove, wherein further travel of the stub shaft transmits rotation to the valve element.

8. The quarter-turn valve of claim 7, wherein the groove is a 90° arcuate, constant radius groove.

9. The quarter-turn valve of claim 7, wherein the end of the groove is adapted to comate with the stub shaft.

10. The quarter-turn valve of claim 1, wherein the cam means is a barrel cam having a face with at least one indent and said seat means has an equal number of protruding bosses on a face of the seats means, whereby the valve seats are placed in the first position when said indents and said bosses are comated.

11. The quarter-turn plug valve of claim 10, wherein the indents and bosses have tapered sides that are comateable.

12. The quarter-turn valve of claim 1, further comprising a plurality of seat biasing springs, said springs assist in maintaining the seal when said seat means are in the first position.

13. The quarter-turn valve of claim 12, wherein the seat biasing springs are Belleville springs, coil springs, or wave springs.

14. The quarter-turn valve of claim 12, wherein the seat biasing springs are Belleville springs.

15. A quarter-turn valve comprising:
    a tubular body having a bore flow passage;
    a valve element having a through flow passage and two or more sealing surfaces, said valve element rotatable through a quarter turn about an axis transverse to said through flow passage, wherein said through flow passage is aligned with said bore flow passage to permit flow when said valve element is positioned at a first end of the quarter turn and is misaligned with said bore flow passage to prevent flow when said valve element is at a second end of the quarter turn;
    a plurality of reciprocable valve seats, said valve seats providing a seal with said sealing surfaces when in a first position and are separated from said sealing surfaces when said valve seats are transitioning to a second position;
    a lost motion actuator having a bevel gear about its circumference, a sun gear on a first face and a stub shaft on a second obverse face, said stub shaft inserted into a 90° arcuate groove on a face of the valving element;
    a plurality of camming elements, wherein each camming element engages the bevel gear on its first side and the reciprocable valve seats on a second obverse side, said camming elements have a detent on the second side that comate with a protruding boss on one side of the valve seats such that when the detent and the boss are comated the valve seats are in a first position, when the camming elements are rotated the boss is forced out of the indent and the valve seats are reciprocated to a second position;
    a plurality of planet gears, said planet gears engaging said sun gear wherein when said planetary gears are rotated said sun gear is rotated; and an actuating valve stem, wherein a 45° rotation of the actuating valve stem correspondingly rotates a ring gear which rotates the planet gears, the rotation of the planet gears rotates the sun gear and the cojoined bevel gear 90°, the rotation of the bevel gear moves the camming elements to force the valve seats into a second position, the stub shaft rotates and abuts the end of the groove, so that when the actuating valve stem is rotated another 45° the stub shaft pushes against the end of the groove causing the valve element to move 90° and the detents and the bosses are moved into alignment and will comate forcing the valve seats into a first position.

16. A quarter-turn valve comprising:

a pressure-containing housing a through bore flow passage;

a sealing plug having a through flow passage and two or more sealing surfaces, said sealing plug rotatable through a quarter turn about an axis transverse to said sealing plug through flow passage to cause said plug to selectively align with the through bore flow passage to open to permit flow or be out of alignment with said housing through bore flow passage to close to prevent flow, an actuating valve stem selectively operable through a quarter-turn input motion for effecting opening or closing of said valve;

motion multiplication means operated by rotation of said actuating valve stem, lost motion means interposed between said motion multiplication means and said sealing plug, barrel cam means coaxial with the housing through bore flow passage and driven without lost motion by the multiplied actuation motion transmitted through a direct-drive coupling, and seat means mateable with said sealing surfaces of said sealing plug and reciprocable due to said barrel camming to a first position out of engagement with said sealing plug prior to sealing plug rotation and reciprocable due to same said barrel camming to a second position in engagement with said sealing plug during completion of sealing plug rotation.

17. A method of opening or closing a quarter-turn valve, said method comprising:

turning an actuating valve stem a first 45° to move a cam means and unseat a plurality of reciprocable valve seats from sealing surfaces on a sealing plug having a through flow passage; and turning the actuator stem a second 45° to reposition the sealing plug in a different alignment with said flow passage and to reseat said valve seat on the sealing surface of said sealing plug.

18. A method for opening or closing a conduit to flow, said method comprising:

inserting a quarter-turn valve in a flow passage of said conduit, said quarter-turn valve comprising:

a tubular body having a bore flow passage;

a valve element having a through flow passage and two or more sealing surfaces, said valve element rotatable through a quarter turn about an axis transverse to said through flow passage, wherein said through flow passage is aligned with said bore flow passage to permit flow when said valve element is positioned at a first end of the quarter turn and is misaligned with said bore flow passage to prevent flow when said valve element is at a second end of the quarter turn;

an actuating valve stem selectively operable through a quarter-turn input motion for effecting opening or closing of said valve element to permit or prevent flow;

motion multiplication means operated by rotation of said actuating valve stem;

cam means coaxial with the bore flow passage, said cam means engaged by the motion multiplication means whereby motion is transmitted to the cam means from said motion multiplication means through a direct-drive coupling;

reciprocable seat means providing a seal with said sealing surfaces when in a first position and separated from said sealing surfaces when in a second position, the seat means forced between the first and second positions by movement of said cam means; and lost motion means interposed between said motion multiplication means and said valve element;

turning the actuating valve stem a first 45° to move the cam means and move the reciprocable seat means into the second position; and turning the actuator stem a second 45° to turn the valve element 90° to realign the valve element and to move the seat means into the first position.

19. A process for reducing friction on a quarter-turn valve while opening or closing said valve, said process comprising:

rotating an actuating valve stem 45°, said stem recessed a one end to form an internal ring gear;

rotating a plurality of planet gears, said planet gear engaging said ring gear wherein rotation of said ring gear rotates said planet gears;

rotating a sun gear, said sun gear engaged and rotated by the rotating planet gears, said sun gear cojoined with a bevel gear;

reciprocating a plurality of valve seats from a first position in contact with a plurality of sealing surfaces on a valve element to a second position separated from said sealing surfaces;

rotating the stem an additional 45° to turn the valve element;

turning the valve element while the valve seats are in the second position, said valve element having a through flow passage whereby turning the valve element aligns or misaligns said through flow passage with fluid flow; and repositioning said valve seats into the first position.

* * * * *